US011255992B2

(12) United States Patent
Poole et al.

(10) Patent No.: US 11,255,992 B2
(45) Date of Patent: Feb. 22, 2022

(54) DEBLENDING METHOD USING PATTERNED ACQUISITION SEISMIC DATA

(71) Applicant: CGG SERVICES SAS, Massy (FR)

(72) Inventors: Gordon Poole, East Grinstead (GB); Simon King, Crawley (GB)

(73) Assignee: CGG SERVICES SAS, Massy (FR)

( * ) Notice: Subject to any disclaimer, the term of this patent is extended or adjusted under 35 U.S.C. 154(b) by 456 days.

(21) Appl. No.: 16/458,393

(22) Filed: Jul. 1, 2019

(65) Prior Publication Data

US 2020/0124751 A1 Apr. 23, 2020

Related U.S. Application Data

(60) Provisional application No. 62/747,313, filed on Oct. 18, 2018.

(51) Int. Cl.
*G01V 1/36* (2006.01)
*G01V 1/28* (2006.01)
*G01V 1/37* (2006.01)

(52) U.S. Cl.
CPC .................. *G01V 1/28* (2013.01); *G01V 1/36* (2013.01); *G01V 1/375* (2013.01); *G01V 2210/1299* (2013.01); *G01V 2210/57* (2013.01)

(58) Field of Classification Search
USPC .......................................................... 702/2
See application file for complete search history.

(56) References Cited

U.S. PATENT DOCUMENTS

| 2002/0181328 A1* | 12/2002 | de Kok | G01V 1/005 367/73 |
| 2014/0303898 A1* | 10/2014 | Poole | G01V 1/003 702/17 |
| 2015/0293249 A1* | 10/2015 | Peng | G01V 1/364 702/16 |

FOREIGN PATENT DOCUMENTS

| EP | 2787370 A2 | 10/2014 |
| GB | 2545390 A | 6/2017 |
| GB | 2547965 A | 9/2017 |

OTHER PUBLICATIONS

Andersson, F., et al., "Flawless diamond separation in simultaneous source acquisition by seismic apparition"; Geophysical Journal International, No. 209, Mar. 23, 2017; pp. 1735-1739.
Robertsson, O.A., et al.; "Signal apparition for simultaneous source wavefield separation"; Geophysical Journal International, No. 206; Jun. 5, 2016; pp. 1301-1305.

(Continued)

*Primary Examiner* — Paul D Lee
(74) *Attorney, Agent, or Firm* — Patent Portfolio Builders PLLC

(57) ABSTRACT

A method for de-blending seismic data associated with an interface located in a subsurface of the earth, includes receiving blended seismic data E generated by firing N source arrays according to a pre-determined sequence Seq; selecting N sub-datasets SDn from the blended seismic data E; interpolating each selected sub-dataset SDn to reference positions ref, where the blended seismic data E is expected to be recorded, to generate interpolated data k; de-blending, in a processor, the interpolated data k to generate de-blended data o; and generating an image of the interface of the subsurface based on the de-blended data o.

20 Claims, 9 Drawing Sheets

(56) References Cited

OTHER PUBLICATIONS

A. Sjoen Pedersen et al., "Wavefield Signal Apparition, Part II—Application to Simultaneous Sources and Their Separation", 78th EAGE Conference & Exhibition 2016, May 30-Jun. 2, 2016, Vienna, Austria.
Fredrik Andersson et al., "Multisource seismic apparition", SEG International Exposition and 87th Annual Meeting, Sep. 24-29, 2017, Houston, Texas, pp. 79-84.
Ian Moore et al., "Simultaneous source separation using dithered sources", SEG Las Vegas 2008 Annual Meeting, Nov. 9-14, 2008, Las Vegas, Nevada, pp. 2806-2810.
J. Siefani et al., "Acquisition Using Simultaneous Sources", EAGE 69th Conference & Exhibition, Jun. 11-14, 2007, London, United Kingdom.
J.O.A. Robertsson et al., "Wavefield Signal Apparition, Part 1—Theory", 78th EAGE Conference & Exhibition 2016, May 30-Jun. 2, 2016, Vienna, Austria.
Lasse Amundsen et al., "Multisource encoding and decoding using the signal apparition technique", Geophysics, Jan.-Feb. 2018, pp. V49-V59, vol. 83, No. 1.
Peeter Akerberg et al., "Simultaneous source separation by sparse Radon transform", SEG Las Vegas 2008 Annual Meeting, Nov. 9-14, 2008, Las Vegas, Nevada, pp. 2801-2805.
Philippe Hermann et al., "De-aliased, High-Resolution Radon transforms", SEG 2000 Expanded Abstracts, Aug. 2018.
R.L. Abma et al., "Separating Simultaneous Sources by Inversion", 71st EAGE Conference & Exhibition, Jun. 8-11, 2019, Amsterdam, The Netherlands.
S. Grion et al., "A Seismic Apparition Experiment on Towed Streamer Seismic Data", 80th EAGE Conference & Exhibition 2018, Jun. 11-14, 2018, Copenhagen, Denmark.
S. Spitz, "Seismic trace interpolation in the F-X domain", Geophysics, Jun. 1991, pp. 785-794, vol. 56, No. 6.
Sergio Grion et al., "Modulation codes and data processing for seismic apparition of towed-streamer seismic data", SEG International Exposition and 88th Annual Meeting, Oct. 14-19, 2018, Anaheim, California, pp. 4201-4205.
Poole, G., et al.; "A deblending strategy using alternating constant delay simultaneous source data"; SEG Denver 2014 Annual Meeting; SEG Technical Program Expanded Abstracts 2014; Aug. 5, 2014; pp. 4335-4339.
Search and Examination Report in corresponding/related Great Britain Application No. GB1914574.7 dated Mar. 20, 2020.

\* cited by examiner

| Record | Source 1 | Source 2 | Source 3 | Source 4 | Source N |
|---|---|---|---|---|---|
| 1 | $c_1 p_1^1$ | $c_2 p_2^1$ | $c_3 p_3^1$ | $c_4 p_4^1$ | $c_N p_N^1$ |
| 2 | $c_1 p_1^2$ | $c_2 p_2^2$ | $c_3 p_3^2$ | $c_4 p_4^2$ | $c_N p_N^2$ |
| 3 | $c_1 p_1^3$ | $c_2 p_2^3$ | $c_3 p_3^3$ | $c_4 p_4^3$ | $c_N p_N^3$ |
| 4 | $c_1 p_1^4$ | $c_2 p_2^4$ | $c_3 p_3^4$ | $c_4 p_4^4$ | $c_N p_N^4$ |
| N | $c_1 p_1^N$ | $c_2 p_2^N$ | $c_3 p_3^N$ | $c_4 p_4^N$ | $c_N p_N^N$ |
| N+1 | $c_1 p_1^1$ | $c_2 p_2^1$ | $c_3 p_3^1$ | $c_4 p_4^1$ | $c_N p_N^1$ |
| N+2 | $c_1 p_1^2$ | $c_2 p_2^2$ | $c_3 p_3^2$ | $c_4 p_4^2$ | $c_N p_N^2$ |

Rows 1 through N+2 form the Sequence.

FIG. 2

| Record | Source 1 | Source 2 | Source 3 | Source 4 | Source N |
|---|---|---|---|---|---|
| 1 | $c_1 p_1$ | $c_2$ | $c_3$ | $c_4$ | $c_N$ |
| 2 | $c_1$ | $c_2 p_2$ | $c_3$ | $c_4$ | $c_N$ |
| 3 | $c_1$ | $c_2$ | $c_3 p_3$ | $c_4$ | $c_N$ |
| 4 | $c_1$ | $c_2$ | $c_3$ | $c_4 p_4$ | $c_N$ |
| N | $c_1$ | $c_2$ | $c_3$ | $c_4$ | $c_N p_N$ |
| N+1 | $c_1 p_1$ | $c_2$ | $c_3$ | $c_4$ | $c_N$ |
| N+2 | $c_1$ | $c_2 p_2$ | $c_3$ | $c_4$ | $c_N$ |

Rows 1 through N+2 form the Sequence.

FIG. 3

| Record | Source 1 | Source 2 | Source 3 | Source 4 | Source N |
|---|---|---|---|---|---|
| 1 | $ref_1+c_1+d_1$ | $ref_1+c_2$ | $ref_1+c_3$ | $ref_1+c_4$ | $ref_1+c_N$ |
| 2 | $ref_2+c_1$ | $ref_2+c_2+d_2$ | $ref_2+c_3$ | $ref_2+c_4$ | $ref_2+c_N$ |
| 3 | $ref_3+c_1$ | $ref_3+c_2$ | $ref_3+c_3+d_3$ | $ref_3+c_4$ | $ref_3+c_N$ |
| 4 | $ref_4+c_1$ | $ref_4+c_2$ | $ref_4+c_3$ | $ref_4+c_4+d_4$ | $ref_4+c_N$ |
| N | $ref_N+c_1$ | $ref_N+c_2$ | $ref_N+c_3$ | $ref_N+c_4$ | $ref_N+c_N+d_N$ |
| N+1 | $ref_{N+1}+c_1+d_1$ | $ref_{N+1}+c_2$ | $ref_{N+1}+c_3$ | $ref_{N+1}+c_4$ | $ref_{N+1}+c_N$ |
| N+2 | $ref_{N+2}+c_1$ | $ref_{N+2}+c_2+d_2$ | $ref_{N+2}+c_3$ | $ref_{N+2}+c_4$ | $ref_{N+2}+c_N$ |

Sequence

FIG. 4

| Record | Source 1 | Source 2 | Source 3 | Source 4 | Source N |
|---|---|---|---|---|---|
| 1 | $r_1+c_1+d_1$ | $r_1+c_2$ | $r_1+c_3$ | $r_1+c_4$ | $r_1+c_N$ |
| 2 | $r_2+c_1$ | $r_2+c_2$ | $r_2+c_3+d_3$ | $r_2+c_4$ | $r_2+c_N$ |
| 3 | $r_3+c_1$ | $r_3+c_2$ | $r_3+c_3$ | $r_3+c_4$ | $r_3+c_N+d_N$ |
| 4 | $r_4+c_1$ | $r_4+c_2+d_2$ | $r_4+c_3$ | $r_4+c_4$ | $r_4+c_N$ |
| N | $r_N+c_1$ | $r_N+c_2$ | $r_N+c_3$ | $r_N+c_4+d_4$ | $r_N+c_N$ |
| N+1 | $r_{N+1}+c_1+d_1$ | $r_{N+1}+c_2$ | $r_{N+1}+c_3$ | $r_{N+1}+c_4$ | $r_{N+1}+c_N$ |
| N+2 | $r_{N+2}+c_1$ | $r_{N+2}+c_2$ | $r_{N+2}+c_3+d_3$ | $r_{N+2}+c_4$ | $r_{N+2}+c_N$ |

Sequence: records 1 through N

FIG. 6

DEBLENDING METHOD USING PATTERNED ACQUISITION SEISMIC DATA

BACKGROUND

Technical Field

Embodiments of the subject matter disclosed herein generally relate to methods and systems for generating and processing seismic data and, more particularly, to mechanisms and techniques for separating seismic data generated with plural source arrays that are fired with a patterned sequence.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

During a seismic survey, when the source (either land source or marine source) is fired according to a standard data acquisition plan, the subsequent recording time is defined so that all useful reflected/diffracted energy is recorded before the next source is fired. This delay time imposes constraints on the acquisition rate and, hence, increases the cost of acquisition.

To reduce the acquisition time, it is possible to simultaneously shoot the sources. The term "simultaneously" should be loosely interpreted in this description, e.g., if first and second sources are considered, the second source may fire less than a second after the first source was fired, and the shooting is still considered to be simultaneous. Generally speaking, the term "simultaneous" encompasses those cases in which the second source fires during the listening time corresponding to the first source. From the seismic receivers' point of view, acquisition of simultaneous source data means that the signals from two or more sources interfere during a given listening time, at least for part of the acquired seismic record. A listening time may be in the range of 1 second to 12 seconds. By acquiring data in this way, the time taken to shoot a dataset is reduced, along with acquisition costs. As an alternative to reducing the acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been excited from a later source position, i.e., a "blended source" survey is acquired. Note that this is in contrast to conventional non-blending surveying techniques, wherein the returning subsurface reflections from one source are not allowed to overlap with the reflections of another source. Although the blended-source approach has the potential to reduce time in the field, thereby proportionally reducing the survey cost, one problem is that it can be difficult to separate the individual shots thereafter, which is necessary in the processing stage. In other words, what is needed in interpreting blended seismic data is the depth of each reflector, and the depth of a reflector is determined by reference to its two-way seismic travel time as generated by a single source. Thus, in a multiple-source survey the goal is to determine which of the observed subsurface reflections is associated with each source, i.e., to de-blend the data; otherwise, the two-wave travel time cannot be reliably determined.

Traditionally, de-blending of simultaneous shooting data falls into the following three categories, all of which rely on some degree on randomized shooting. The first category is impulsive de-noising. This method (disclosed for example by Stefani et al., (2007) "Acquisition using simultaneous sources," 69th EAGE Conference & Exhibition, the entire content of which is incorporated herein by reference) uses the fact that when data is sorted into any domain other than the common shot, the cross-talk noise from other sources has random timing. This random timing allows the use of impulsive-noise attenuation techniques, which are already available and used in other processing steps, for example, swell-noise attenuation. While this method can be effective for removing the strongest cross-talk energy, low-amplitude cross-talk noise is not seen as impulsive and will not be removed. Further, this method may attenuate the primary energy because it makes use of thresholds.

A second category includes iterative coherency enhancement/de-noising. Iterative coherency enhancement/de-noising techniques are described in, e.g., Abma et al., (2009) "Separating simultaneous sources by inversion," 71st EAGE Conference & Exhibition, the entire content of which is incorporated herein by reference, and rely on the fact that cross-talk noise on some traces is a duplication of signal energy on other traces. This means that with knowledge of the timing of all shots, a signal estimate made for one source can then be used to reduce the level of cross-talk for all other sources.

A third category includes the full modeling of energy from all sources. The full modeling scheme (e.g., Akerberg et al., (2008) "Simultaneous source separation by sparse Radon transform," 78th Ann. Internat. Mtg.: Soc. of Expl. Geophys, and Moore et al., Simultaneous source separation using dithered sources, 78th Ann. Internat. Mtg.: Soc. of Expl. Geophys, the entire contents of which are incorporated herein by reference) has similarities to the iterative de-noising method, except that this formulation solves the relationship between source energy and cross-talk noise implicitly at the core of the problem formulation. The equations can be formulated as designing a transform domain for each source or spatial area (e.g., tau-p domain, Fourier domain, etc.) such that when it is reverse-transformed and re-blended, the raw input data is reconstructed as accurately as possible in a least squares sense.

This technology has the timings and positioning of all sources at the core of the algorithm and also relies on a sparse solution to the equations. Once the transform domains have been calculated, the final step to de-blend the data requires application of reverse-transform without re-blending. While this method may result in some filtering of the original data, it removes low-amplitude cross-talk noise and preserves the primary signal. This method could be considered an alternate way of solving the same problem as the iterative coherency enhancement/de-noising technique (with the analogue of sparse least squares Radon versus inversion through "iterative cleaning").

All the above-discussed methods rely on randomized shooting. However, as it is discussed next, there is an alternative to the randomized shooting methods that is capable of acquiring seismic data more suitable for de-blending.

SUMMARY OF THE INVENTION

According to an embodiment, there is a method for de-blending seismic data associated with an interface located in a subsurface of the earth. The method includes receiving blended seismic data E generated by firing N source arrays according to a pre-determined sequence Seq; selecting N sub-datasets SDn from the blended seismic data E; interpolating each selected sub-dataset SDn to reference positions ref, where the blended seismic data E is expected to be recorded, to generate interpolated data k; de-blending, in a processor, the interpolated data k to generate de-blended data o; and generating an image of the interface of the subsurface based on the de-blended data o.

According to another embodiment, there is a method for de-blending seismic data associated with an interface located in a subsurface of the earth. The method includes receiving blended seismic data E generated by plural simultaneous firings of N source arrays, wherein the blended seismic data is encoded using N predefined source array emission modifications; selecting N sub-datasets SDn from the blended seismic data E such that each sub-dataset SDn is associated with a predefined and specific source emission modification; interpolating each selected sub-dataset SDn to reference positions ref, where the blended seismic data E is expected to be recorded, to generate interpolated data k; de-blending, in a processor, the interpolated data k to generate de-blended data o; and generating an image of the interface of the subsurface based on the de-blended data o, where the N predefined source array emission modifications related to one of a phase rotation or amplitude scaling.

According to still another embodiment, there is a computing system for de-blending seismic data associated with an interface located in a subsurface of the earth. The computing device includes an interface for receiving blended seismic data E generated by firing N source arrays according to a pre-determined sequence Seq; and a processor connected to the interface. The processor is configured to select N sub-datasets SDn from the blended seismic data E; interpolate each selected sub-dataset SDn to reference positions ref, where the blended seismic data E is expected to be recorded, to generate interpolated data k; de-blend the interpolated data k to generate de-blended data o; and generate an image of the interface of the subsurface based on the de-blended data o.

BRIEF DESCRIPTION OF THE DRAWINGS

For a more complete understanding of the present invention, reference is now made to the following descriptions taken in conjunction with the accompanying drawings, in which:

FIG. 2 illustrates a patterned shooting sequence for plural source arrays to be used during the survey;

FIG. 3 illustrates another patterned shooting sequence for plural source arrays to be used during the survey;

FIG. 4 illustrates still another patterned shooting sequence for plural source arrays to be used during the survey;

FIG. 6 illustrates another patterned shooting sequence for plural source arrays to be used during the survey;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine seismic system. However, the embodiments to be discussed next are not limited to a marine seismic system, but may also be applied to a land seismic system, transition zone, autonomous node positioned in a water column or ocean bottom survey (node or cable) (OBS) system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method for de-blending seismic data acquired by simultaneous shooting. The seismic data is acquired by firing the plural source arrays according to a given pattern (sequence) and the acquired blended seismic data is deblended by using interpolation and solving a minimization problem that is constrained by the interpolated data.

Figure 1:
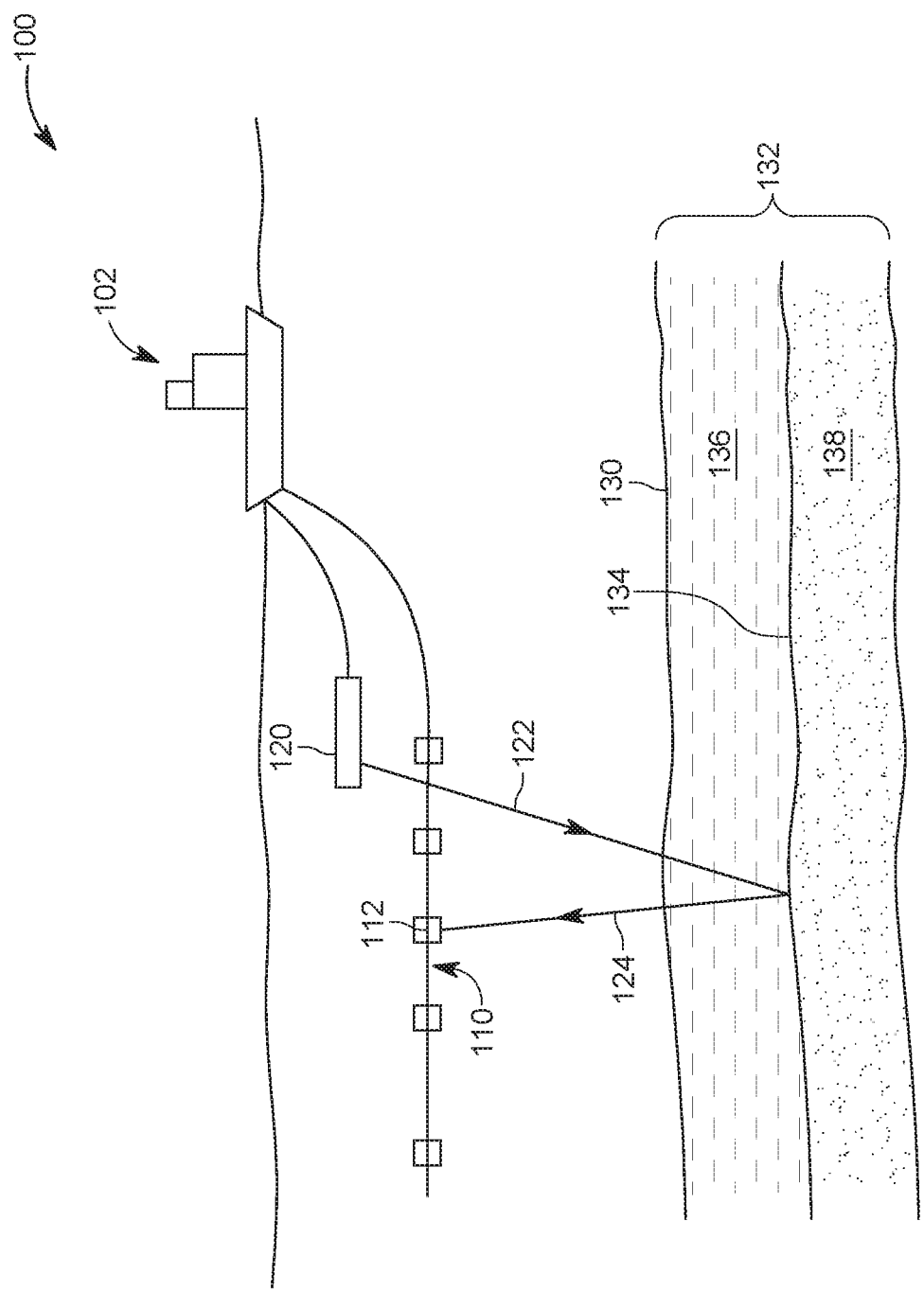
FIG. 1 illustrates a seismic data acquisition system that surveys a given subsurface of the earth.

The method for acquiring the seismic data is discussed first followed by the method for deblending the acquired seismic data. FIG. 1 illustrates a marine seismic system 100 that includes a vessel 102 towing a plurality of streamers 110 (only one is shown for simplicity) and a seismic source array 120. Each streamer 110 includes plural seismic receivers 112, which are configured to record seismic waves. Receiver 112 may be a hydrophone, geophone, accelerometer, gravity sensor, optical fiber sensor, etc. The source array 120 (which may be vibratory or impulsive source) generates seismic waves 122, and they propagate toward the ocean bottom 130. Some of the waves enter the subsurface 130 and get reflected and/or refracted at an interface (reflector) 134 separating two different layers 136 and 138. The two layers 136 and 138 have different properties (e.g., these properties may be characterized by the different impedances of the layers) so that a seismic wave propagates with different velocities v1 and v2 through the two layers. Because of the different impedances of the layers, the incoming seismic wave 122 is reflected at the interface 134, and the reflected seismic wave 124 propagates upwards and is recorded as seismic data E at receiver 112.

The seismic data acquisition system 100 can include plural seismic source arrays (FIG. 1 shows, for simplicity, a single source array 120). In one embodiment, it is possible that vessel 102 tows all the plural source arrays. However, it is also possible that plural vessels tow the plural seismic source arrays. A source array includes plural individual seismic sources, for example, air guns or vibratory elements. It should be noted that sources consisting of one source element (i.e., not an array) may also be used, for example, single vibroseis trucks, dynamite, or weight drop.

The manner in which the plural source arrays are fired is now discussed with regard to FIG. 2. For the general case, N seismic source arrays are considered and either all the N seismic source arrays or a group of the N seismic source arrays are fired within an earth response listening time, i.e., the N source arrays are fired simultaneously, or any subset of the N source arrays are fired simultaneously, with the remaining source arrays being fired simultaneously or being, at their turn, further divided into groups that each source array belonging to a given group is fired simultaneously with the other source arrays of the same group. This means that if N=6, all six source arrays are fired simultaneously. However, if N=6 and two groups of source arrays are formed, a first group of 3 source arrays is fired first (simultaneously) and a second group of 3 source arrays is fired second (simultaneously). For this last case, the odd recordings and the even recordings are treated as two different datasets for the purpose of deblending. In another application, the group of 6 source arrays can be split into a first group of 2 source arrays and a second group of 4 source arrays. Then, the source arrays in each group are fired simultaneously. In other words, the number N of the total source arrays does not have to be divided into groups having an equal number of source arrays, if not all the N source arrays are fired simultaneously. Further, the source arrays in each group take turns to fire with a linear operator based modification, $p_j^i$, where index "i" describes the record number for a given sequence Seq and index "j" describes the source array number. Expressed as linear operators and applied as multiplications in the Fourier-space (fx) domain, the firing pattern is illustrated as shown in FIG. 2. For example, the modification $p_3^2$ in FIG. 2 refers to record 2, source array 3, or record N+2, source array 3, etc. A record "r" includes the shootings for all N source arrays at a given reference ref (the reference ref could be a reference time or a reference position), i.e., record r3 at a given time 3 includes shootings ($c_1 p_1^3$, $c_2 p_2^3$, $c_3 p_c^3$, $c_4 p_4^3$, ... $c_N p_N^3$). The modification $p_j^i$ could be a time delay, amplitude change, phase rotation, source signature modification (e.g., firing different airguns within a seismic source), or a combination thereof. There may optionally be an additional modification $c_j$, which may relate to a given source array j. The modification $c_j$ is a constant additional time delay or amplitude change relative to the other source arrays. Indices i and j can take any value between 1 and N. The coding may be fixed for a whole survey, vary from sailline-to-sailline, or may vary during a same sailing (for example, using a different coding for each sequential block of 100 shots).

A sequence Seq is defined as including all the records $r_1$ to $r_N$ associated with the consecutive firing of each source array of the N source arrays considered in this example. As shown in FIG. 2, the sequence Seq includes records 1 to N. The sequence Seq repeats itself and includes in the next iteration the records N+1 to 2N, which have the same pattern as the records 1 to N in the previous sequence. Note that the same sequence Seq is repeated after the N source array is fired.

A feature of this shooting sequence, or any other shooting sequence that makes the novel de-blending method possible, is the patterned application of the modification p to the firing of the source arrays. The sequence Seq includes exactly a number N of records r, where N is equal to the number of the plural source arrays, and in the sequence Seq, each source array j is fired at least once with a corresponding modification $p_j$, which is specific for that source array and repeated in each sequence.

A more specific example of firing the N source arrays discussed above is illustrated in FIG. 3, where, during each sequence, each source array is fired only once with the modification $p_j^i$. For all the other firing instances in a given sequence, the same source array is fired only with the corresponding modification c, and not with the modification p.

In still another embodiment, as illustrated in FIG. 4, each source array is fired with a delay $d_i$, which is constant and specific for each source array. Each source array i is fired only once with the delay $d_i$ for each sequence Seq and no two recordings $r_i$ and $r_j$ have the same firing pattern in a same sequence. FIG. 4 assumes that the time-domain is used for illustrating the time delays applied to the N source arrays. This means that source array S1 is fired with the same delay d1, once per sequence, in each sequence, source array S2 is fired with the same delay d2, once per sequence, in each sequence, and so on. However, also note that for each record r, only one source array of the N source arrays is fired with the corresponding delay d. The delay $d_i$ may be expressed as a linear multiplication by a complex exponential, $e^{2\pi i f t}$. There may optionally be an additional constant time delay, $c_i$, in the firing of each source array, relative to a reference time, ref. The reference time ref may relate to the time a given source array, or the vessel itself, reaches a pre-defined position, commonly known as a pre-plot position. Firing times for successive sequences may follow the scheme illustrated in FIG. 4. In other words, this scheme cycles around each source array to take a turn to have the additional delay d. Hence, the firing time of seismic records repeats with a cycle of a length equal to the number of source arrays. In still another embodiment, each source array may use the same delay, i.e., $d_1 = d_2 = d_3 = d_4 = d_N$. The delay may be in the range of 0.5 ms to 800 ms.

Figure 5:
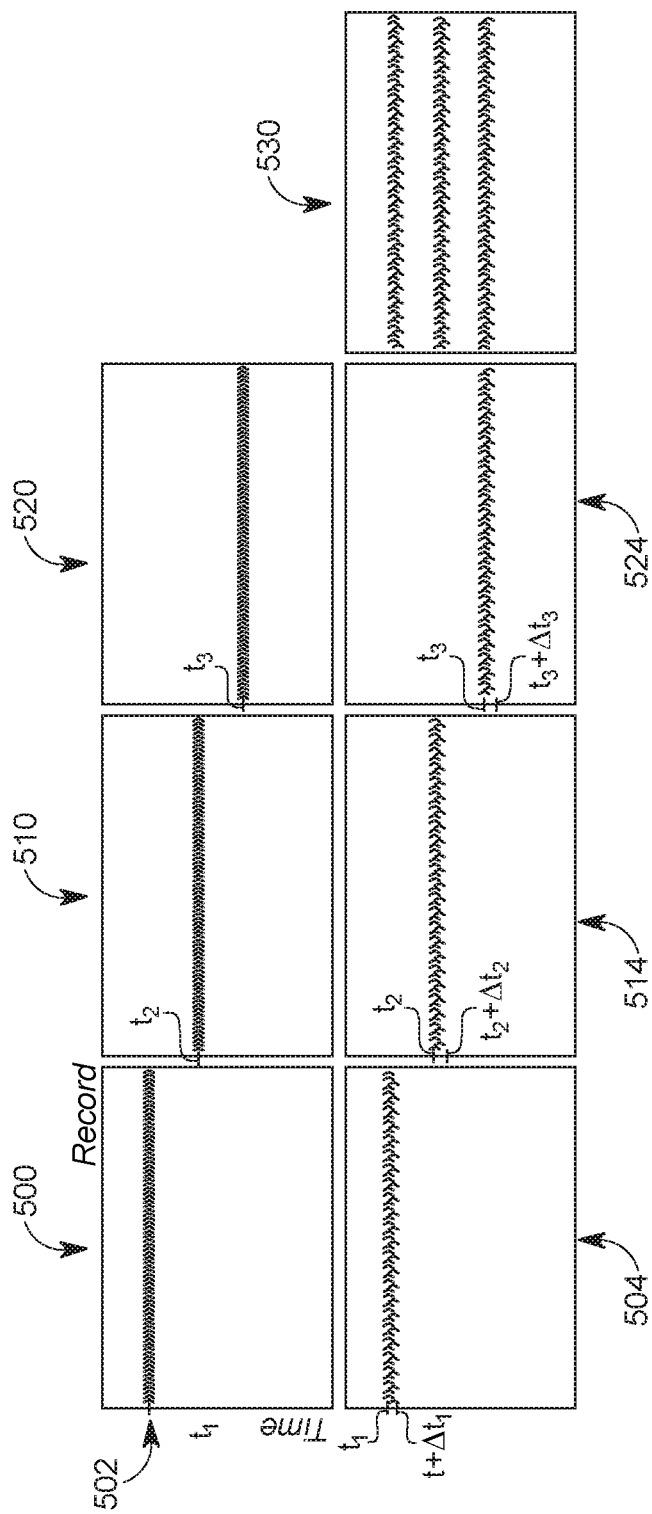
FIG. 5 illustrates synthetic data generated with one of the patterned shooting sequence illustrated in FIGS. 2-4.

A synthetic example of seismic data acquired with only 3 source arrays using one of the above discussed patterns is illustrated in FIG. 5. FIG. 5 shows a recording 500 for source array S1, when the source array fires with no modifications. Note that all the traces in the recording 500 have the maximum 502 recorded at the same time t1. However, when the source array S1 is encoded, i.e., fired with a modification every third firing, as for example, illustrated in FIG. 3, some of the traces remain aligned at the same time t1, but those traces that are recorded when the source array is fired with the delay, have their maximum shifted downward, to a time $t1+\Delta t_1$, as shown in recording 504. A similar pattern can be observed in recordings 510 and 514 for the second source array S2, for a given time t2 and a delay $\Delta t_2$, and in recordings 520 and 524 for the third source array S3, for a given time t3 and a delay $\Delta t_3$. When recorded as blended data, the traces recorded due to the simultaneous shooting of the three source arrays S1 to S3 are illustrated in the recording 530.

Note that the order in which the source arrays are fired with a corresponding modification p, during a same sequence Seq, is not required to be as illustrated in FIG. 4, i.e., source array S1 first, source array S2 second, and so on. The order of firing the source arrays within a sequence with the corresponding modification p may be changed, as illustrated in FIG. 6, where source array S1 is shot first with delay d1, then source array S3 is shot with the delay d3, then source array SN is shot with the delay dN, and then source array S4 is shot with the delay d4. Other orders for shooting the source arrays within a given sequence may be used as long as each sequence follows the same pattern as the other sequences and each source array is shot with the same modification p for a same recording r.

The acquisition approach discussed above may be implemented for land, towed streamer, ocean bottom, autonomous node or transition zone surveys. The source array may relate to an airgun, sparker, boomer, pinger, marine vibrator, dynamite, weight drop, vibroseis, or another source. The above approach relates to the shooting pattern for a single acquisition line. A single acquisition line relates to the recording of a given receiver for a given time interval, usually a few hours, for a given survey area. The N source arrays may be towed by a single vessel, or by more than one vessel. The receivers may be towed by the same vessel, a different vessel, or relate to an ocean bottom or land receiver. Different acquisition lines within the same survey area may employ the same encoding sequence, or may use alternative encoding approaches. For example, another sail-line in a given survey may use dithered or randomized shooting of the N-source arrays. Alternatively, another sail-line in a given survey may employ the strategy outlined above, but with a delay order varying as illustrated in FIG. 6.

Instead of using time delays, other encoding methods may be employed. For example, a change in the signal's strength or shape may be used. Note that an encoding using a change in the signal shape can be used in conjunction with time delays. The change in the signal strength/shape may be implemented through varying Vibroseis sweep lengths (shorter sweep length=lower signal strength), or by changing the number of airguns firing within a marine source array. For example, this means that a first signal strength/shape may be obtained if all elements of the source array are fired simultaneously and a second signal strength/shape may be obtained if only a subset of elements of the source array are fired simultaneously and the other elements are not fired at all.

Having acquired the seismic data with the strategies discussed above, the method moves to process the seismic data to determine the underground location of the interface 134 illustrated in FIG. 1. This is important because in order to successfully drill a well into the ground, the boundaries of the oil and/or gas reservoir need to be known and the interface 134 may be one such boundary.

There are many existing methods for deblending seismic data and they are briefly summarized as follow:

Device and method for de-blending simultaneous shot data as discussed in European Patent no. EP 2787370;

Source separation method as discussed in Great Britain Patent no. GB 2,547,965;

Method and system for generating geophysical data, generating a geophysical wavefield with a signature that varies in a periodic pattern, as disclosed in Great Britain Patent no. GB 2,545,390;

Robertsson, J. O. A, Amundsen, L. and Pederson, A. S., (2016), Wavefield Signal Apparition, Part I—Theory, EAGE Expanded Abstracts;

Pederson, A. S. Amundsen, L. and Robertsson, J. O. A., (2016), Wavefield Signal Apparition, Part II—Application to Simultaneous Sources and Their Separation, EAGE Expanded Abstracts;

Robertsson, J. O. A, Amundsen, L. and Pederson, A. S., (2016), Signal apparition for simultaneous source wavefield separation, Geophysical Journal International;

Andersson, F., Amundsen, L., van Manen, D.-J., Robertsson, J. O. A. and Eggenberger, K., (2017), Multisource apparition, SEG Expanded Abstracts;

Andersson, F., Robertsson, J. O. A., van Manen, D.-J., Wittsten, J., Eggenberger, K., and Amundsen, L., (2017), Flawless diamond separation in simultaneous source acquisition, Geophysical Journal International;

Grion, S., Light, R., and Deeney, S., (2018), A Seismic Apparition Experiment on Towed Streamer Data, EAGE Expanded Abstracts;

Amundsen, L., Andersson, F., van Manan, D.-J., Robertsson, J. O. A. and Eggenberger, K., (2018), Multisource encoding and decoding using the signal apparition approach, Geophysics; and Grion, S., Martin, D., and Denny, S., (2018), Modulation codes and data processing for seismic apparition of towed-streamer data, SEG Expanded Abstracts.

Amundsen et al. (2018) present an approach to encode simultaneous sources in a multi-source acquisition and show how to decode the acquired data into individual N source responses. An N×N linear system of equations is solved for each temporal frequency in the spatial wavenumber domain. The linear operator is a product of two matrices, a Fourier matrix F and an encoding matrix A. The encoding matrix A contains the appropriate time delays and/or amplitude changes. The linear equations can be written as follows:

$$FAD=E, \qquad (1)$$

where the Fourier matrix F (size N×N) is defined as:

$$F = \frac{1}{\sqrt{N}} \begin{bmatrix} 1 & 1 & 1 & 1 & 1 \\ 1 & e^{\frac{-2\pi i \cdot 1 \cdot 1}{N}} & e^{\frac{-2\pi i \cdot 1 \cdot 2}{N}} & \cdots & e^{\frac{-2\pi i \cdot 1 \cdot (N-1)}{N}} \\ 1 & e^{\frac{-2\pi i \cdot 2 \cdot 1}{N}} & e^{\frac{-2\pi i \cdot 2 \cdot 2}{N}} & \cdots & e^{\frac{-2\pi i \cdot 2 \cdot (N-1)}{N}} \\ \vdots & \vdots & \vdots & \cdots & \vdots \\ 1 & e^{\frac{-2\pi i (N-1) \cdot 1}{N}} & \cdots & \cdots & e^{\frac{-2\pi i (N-1)^2}{N}} \end{bmatrix}, \qquad (2)$$

and the encoding matrix A (size N×N) is given by:

$$A = \frac{1}{\sqrt{N}} \begin{bmatrix} A_{11} & A_{12} & A_{13} & \cdots & A_{1N} \\ A_{21} & A_{22} & A_{23} & \cdots & A_{2N} \\ A_{31} & A_{32} & A_{33} & \cdots & A_{3N} \\ \vdots & \vdots & \vdots & \cdots & \vdots \\ A_{N1} & A_{N2} & A_{N3} & \cdots & A_{NN} \end{bmatrix}, \qquad (3)$$

where an individual element of the matrix A can be defined as $A_{ij}e^{i2\pi f t_{ij}}$ where A is the amplitude/strength and $t_{ij}$ is the time delay of the source from a reference time. Vector D represents the individual sources ($D_1, \ldots, D_N$), which have been separated, and vector ($E_1, \ldots, E_N$) represents the encoded wavefields in the frequency-wavenumber domain. Equation (1) can be inverted as follows, to obtain the individual N source responses, $$D=A^{-1}F^{H}E, \qquad (4)$$

where H represents the complex conjugate transpose. More details on the encoding and inversion equations (1) to (4) can be found in Amundsen et al. (2018), which is included herein by reference. This approach finds deblended data D, by solving a linear equation in the FK domain, given the recorded blended seismic data, E.

Grion et al. (2018), EAGE and SEG abstracts (also incorporated herein by reference), use the approach outlined by Amundsen et al. (2018) to test the performance of apparition on towed-streamer marine seismic data. The apparition methodology is only applicable for lower frequencies. To improve the separation at higher frequencies and to reduce noise levels in the final result, Grion et al. (2018) first interpolates the data in the space-frequency domain, combines the results in a way which is appropriate for apparition, and then performs source separation using the equations above. The original shot sampling is achieved by dropping the interpolated traces.

Figure 7:
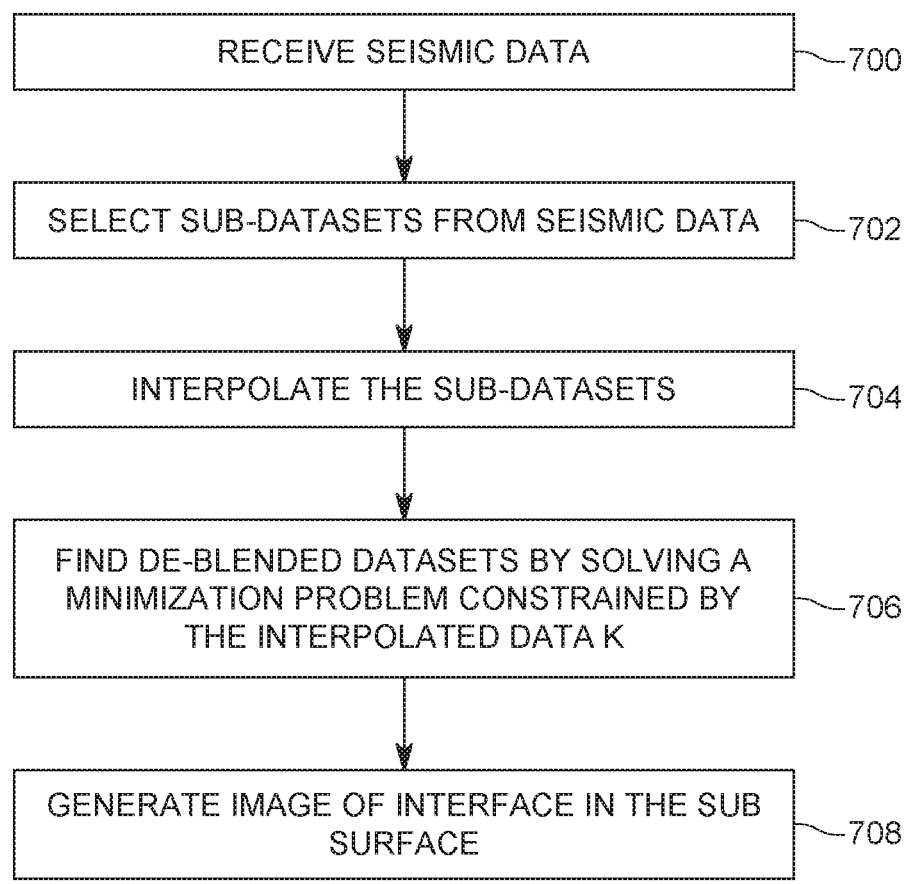
FIG. 7 is a flowchart of a method for deblending seismic data acquired with one of the patterns illustrated in FIGS. 2-4 and 6.

While these methods may be used to deblend the blended seismic data, another approach is now proposed. According to a method illustrated in FIG. 7, the seismic data E recorded according to one of the patterns illustrated in FIGS. 2-4 and 6, is received in step 700. This seismic data E is acquired by simultaneously firing the source arrays (either all N of them or groups of the N source arrays as discussed above), with the encoding (modifications) previously discussed. Thus, seismic data E is encoded and blended. For example, each source array has a pre-determined modification which is repeated for every sequence Seq. The modification may refer to a time shift, amplitude change, shape change, etc. The modification may include one or more of the operators c, p and/or d discussed with regard to FIGS. 2-4 and 6. The seismic data E is recorded by seismic receivers 112, which are distributed over streamers for a marine seismic acquisition system, over the ground for a land seismic system, or over the ocean bottom for an ocean bottom seismic survey. Each receiver records consecutive sets of traces, each trace including signals from all the source arrays.

In step 702, N sub-datasets SDn of seismic data are selected from the initial seismic data E, where n varies from 1 to N. The initial seismic data includes plural sequences Seq of recordings $r_i$, where i goes from 1 to N. These sub-datasets SDn are selected as follows: from all the records $r_i$ shown, for example, in FIG. 2, each sub-dataset SDn is selected to include records $r_n$, $r_n+N$, $r_n+2N$, $r_n+3N$, . . . , where n runs from 1 to N and N is the total number of source arrays. In other words, each sub-dataset SDn includes one recording from each sequence, and that recording has the same position in each of the sequence. Because of this specific selection, the selected sub-datasets SDn have the following properties: any two selected sub-datasets SDn and SDm have their intersection zero and the union of all the selected sub-datasets SDn is the seismic data E. For example, if N is assumed to be 3, then sub-dataset SD1 includes records (see FIG. 2 or 3 or 4 or 6) r1, r4, r7, r10 and so on, sub-dataset SD2 includes records r2, r5, r8, r11, and so on and sub-dataset SD3 includes records r3, r6, r9, r12, and so on. Note that each record ri includes seismic data generated by shooting all the source arrays, at a given reference location ref, with at least one source array having a modification p. The modification p refers to a modification of the timing, amplitude, shape or a combination of them. The reference location ref is, in one embodiment, a pre-calculated location along a sail-line where a source array is expected to be fired or a receiver is expected to record seismic data. These positions are calculated in advance of the seismic survey and they form a grid.

The method then interpolates in step 704 the sub-datasets SDi to the original recording positions ref to obtain the components $k_i$ of the vector k. This means that for the above example in which N=3 source arrays, the sub-dataset SD1 is interpolated to the positions corresponding to the sub-dataset SD2, and also to the positions corresponding to the sub-dataset SD3. Thus, for each position where the seismic data is recorded, there are three sets of data, one recorded, and two sets obtained through interpolation from the other two sub-datasets. These three sets (N sets if N source arrays are used) are combined together into the component $k_i$ of the vector k.

In one application, this step may be based on methods which may not go beyond aliasing, for example sinc interpolation. Alternatively, the step of interpolating may go beyond aliasing, for example the fx-interpolation of Spitz (see S. Spitz (1991), "Seismic trace interpolation in the F-X domain," GEOPHYSICS, 56(6), 785-794, https://doi.org/10.1190/1.1443096), or sparse inversion driven approaches (see Herrmann, P., Mojesky, T., Magesan, M., and Huggonet, P. (2001), "De-aliased, High-Resolution Radon transforms," SEG conference proceedings).

Figure 8B:
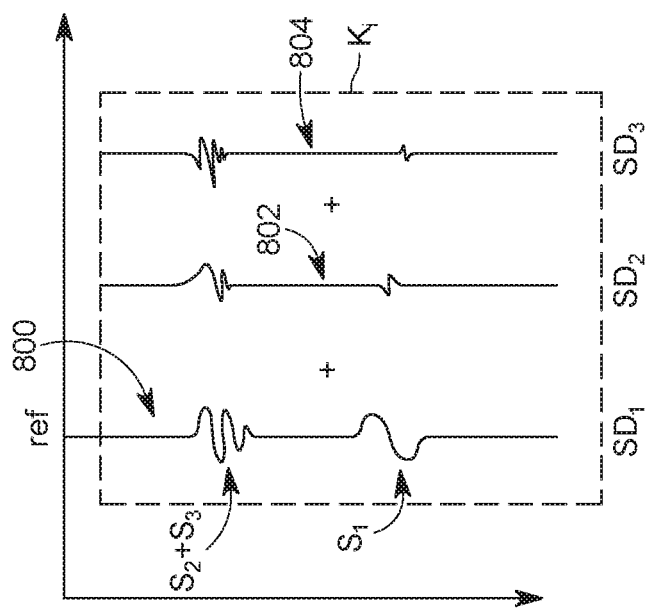
FIGS. 8A and 8B illustrate an interpolation process of the recorded seismic data during the deblending stage.
Figure 8A:
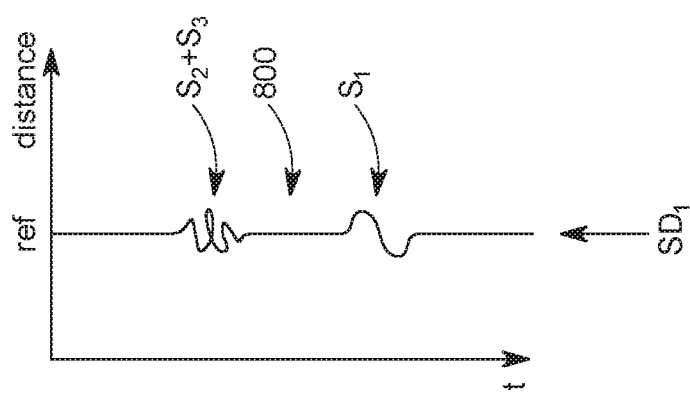

Then, in step 706, a minimization problem, constrained by the interpolated data k is performed to separate the seismic data o for the N source arrays. This step of solving a minimization problem may involve finding a deblended dataset $o_i$ for each source array $S_i$, which encodes the interpolated data k. The minimization problem may be linear or non-linear, and may be in the time-space domain or a frequency-space domain. An example of the problem in the frequency-space domain may be as follows:

$$k = Co, \tag{5}$$

$$\begin{pmatrix} k_1 \\ k_2 \\ k_3 \end{pmatrix} = \begin{pmatrix} c_1 p_1 & c_2 & c_3 \\ c_1 & c_2 p_2 & c_3 \\ c_1 & c_2 & c_3 p_3 \end{pmatrix} \begin{pmatrix} o_1 \\ o_2 \\ o_2 \end{pmatrix}, \tag{6}$$

where k1, k2, and k3 are the components of the vector k, and each of them include three sub-sets of data, one sub-set that corresponds to the recorded seismic data for selected recording positions, and two sub-sets that correspond to interpolated data, based on the sub-datasets of the recorded seismic data, at other recording positions. The three sub-sets of data for each of the components k1, k2 and k3 are illustrated in FIGS. 8A and 8B. FIG. 8A shows a trace 800 of the seismic data that is recorded at a given recording position ref. Note that only three source arrays S1 to S3 are considered in this figure, and the trace 800 includes blended responses from source arrays S2 and S3, and also a time delayed response from the source array S1, as the modification p has been applied to the source array S1. From the recorded seismic data, a first sub-set is selected in step 702, as previously discussed. Note that FIGS. 8A and 8B are cartoons for illustrating the seismic data at each reference ref, and should not be construed as an accurate representation of the selected recordings for a real situation. FIG. 8B shows that the interpolation step 704, there is, in addition to the trace 800 (recorded data), also an interpolated trace 802 obtained from the second sub-data set SD2, and another interpolated trace 804, obtained from the third sub-data set SD3. The interpolated trace 802 is obtained when the interpolation step 704 is applied to the second sub-dataset, and the interpolated trace 804 is obtained when the interpolation step 704 is applied to the third sub-dataset. Thus, any of the components k1, k2, and k3, for a 3 source array system, would include one sub-dataset 800 of measured seismic data and two sub-datasets 802 and 804 of interpolated seismic data, where the interpolation is based on the other sub-datasets of recorded seismic data. It should be understood that the original traces may also be modified before being used in the inversion step, for example they may be denoised with an fx denoise process. This may be beneficial to ensure that the character of the original traces is consistent with the interpolated traces, which may have a lower noise content.

In step 708, an image of the interface 134, shown in FIG. 1, is generated based on the deblended data from step 706 and this image is used by those that drill the well to guide the drilling process.

The o1, o2, and o3 components in equation (6) correspond to the deblended data and they are obtained by a minimization problem of equation (6). The components k1 to k3 and o1 to o3 are column vectors for a frequency slice for a given range of records.

Step 700 discussed above may also be implemented with a different sequence than what was discussed in the embodiments illustrated in FIGS. 2-4 and 6. More specifically, suppose that there are N source arrays and N firing patterns $P_i$, which are repeated as follows: $P_1$, $P_2$, $P_3$, $P_1$, $P_2$, $P_3$, etc. (in this example, i varies from 1 to 3, i.e., N=3 and this shooting pattern is similar to the one shown in FIG. 3). It is possible to select (step 702) all the seismic data associated with the P1 patterns (first sub-dataset), all the seismic data associated with the $P_2$ pattern (second sub-dataset) and interpolate (step 704), all the seismic data associated with the $P_3$ pattern (third sub-dataset) and interpolate (step 704) and then solve the minimization problem (step 706) using the interpolated data to deblend.

However, it is also possible to have the following acquisition scheme: $P_1$, $P_3$, $P_1$, $P_2$, $P_3$, $P_1$, $P_2$, $P_3$, $P_2$, $P_3$, $P_1$, etc. (the N patterns are used in a way that they are not repeated as in the sequence Seq in FIGS. 2-4 and 6). The selection step 702 would still select all the $P_1$ records and interpolate, $P_2$ records and interpolate, and $P_3$ records and interpolate, as in the previous embodiment. The only difference is that this interpolation step would have, as input, predetermined irregular sampling. The N patterns may be described as pre-defined source emission modifications, such that the output of a source array may vary for at least one of the patterns. The modification may relate to an amplitude scaling or phase rotation, which may be constant, or may vary as a function of temporal frequency. Note that a phase rotation that varies as a function of a temporal frequency may encode a time delay, i.e., function $e^{2\pi i f t}$ describes a time delay. In the general sense, the source array emission modification may be simulated through application of a convolutional filter in the time domain, or a complex multiplication in the frequency domain. One example of such predetermined irregular sampling is when a recording $r_2$ is made after a distance L1, from a position of the recording $r_3$, and the next recording r1 is made after another distance L2, which may be different from the distance L1. Note that the predetermined irregular sampling illustrated above is not a random distribution of the patterns $P_i$, but rather an irregular distribution in which no pattern is skipped.

A method for de-blending seismic data associated with an interface located in a subsurface of the earth, and which uses the irregular sampling discussed above may include a step of receiving blended seismic data E generated by plural simultaneous firings of N source arrays, wherein the blended seismic data is encoded using N predefined source array emission modifications, a step of selecting N sub-datasets SDn from the blended seismic data E such that each sub-dataset SDn is associated with a predefined and specific source emission modification, a step of interpolating each selected sub-dataset SDn to reference positions ref, where the blended seismic data E is expected to be recorded, to generate interpolated data k, a step of de-blending, in a processor, the interpolated data k to generate de-blended data o, and a step of generating an image of the interface of the subsurface based on the de-blended data o, where the N predefined source array emission modifications related to one of a phase rotation or amplitude scaling.

Figure 9:
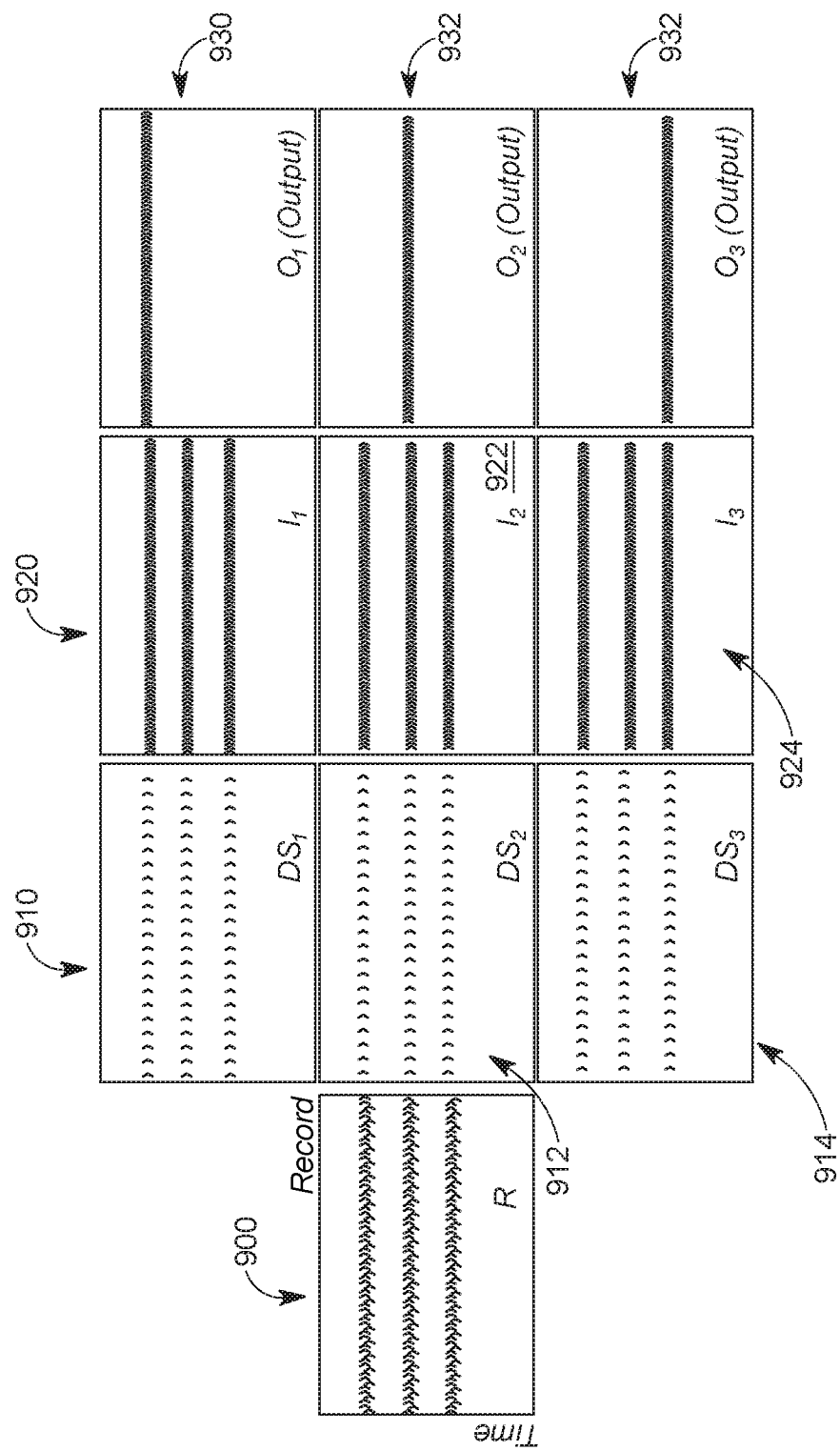
FIG. 9 illustrates how the deblending process works on the acquired blended seismic data.

FIG. 9 illustrates the application of this method to blended seismic data E acquired with encoding, as shown in panel 900. Panels 910, 912, and 914 show the sub-datasets SD1 to SD3 selected in step 702. Note that the traces in these three sub-datasets are shifted to the right from panel to panel as no two panels include the same traces. In panels 920, 922, and 924, the interpolated data k is shown as is obtained as discussed in step 704. Note that all the missing traces in panels 910, 912, and 914 have been created in panels 920, 922, and 924 based on the interpolation of the existing data in each panel. In panels 930, 932, and 934, the deblended data $o_1$, $o_2$, and $o_3$ is illustrated, and this data has been calculated as discussed in step 706, by minimizing a given problem.

For the minimization problem represented by equation (6), two sets of linear operators (c and p) encode the interpolated data (k) from the output deblended data (o). The p terms relate to periodic, or patterned, changes to the source signal, whereas the c terms are constant operators which are fixed for a given source array, as previously discussed with regard to FIGS. 2 to 4 and 6. These linear operators may relate to time shifts ($e^{2\pi i f t}$), amplitude scalars or a combination of both.

In the case that constant terms c are not used, and that the periodic terms p relate to a time delay, equation (6) may be re-written as follows:

$$\begin{pmatrix} k_1 \\ k_2 \\ k_3 \end{pmatrix} = \begin{pmatrix} e^{2\pi f d_1} & 1 & 1 \\ 1 & e^{2\pi f d_2} & 1 \\ 1 & 1 & e^{2\pi f d_3} \end{pmatrix} \begin{pmatrix} o_1 \\ o_2 \\ o_3 \end{pmatrix}, \quad (7)$$

where f is the temporal frequency in Hz. In the case that a non-time shift based encoding scheme is used, the non-unity matrix terms would be replaced by said non-time shift encoding amplitude and/or source signature.

In another embodiment, it is possible to deblend the seismic data, in step 706, by using the following equation, where the different source arrays take different time shifts described by modifications p1 to p9:

$$\begin{pmatrix} k_1 \\ k_2 \\ k_2 \end{pmatrix} = \begin{pmatrix} p_1 & p_2 & p_3 \\ p_4 & p_5 & p_6 \\ p_7 & p_8 & p_9 \end{pmatrix} \begin{pmatrix} o_1 \\ o_2 \\ o_3 \end{pmatrix}. \quad (8)$$

While the above linear equations have been described in the context that they operate on all records along an acquisition line, it should be noted that they may also operate on a subset of the data. The subset may be as small as a single record. In this case, and considering the case of three sources, the column vector on the right hand side would consist of 3 complex numbers, one relating to a single frequency for each of three sources. The column vector on the left hand side would relate to three blended measurements at this record position, one may be recorded data and the other two may be interpolated data. The matrix, as before, relates to an encoding of the blended data from the deblended data (which is to be found by inversion).

This approach may use an inversion in the space-time domain or space-frequency domain between deblended data and interpolated data. The input may have been transformed into a model domain. For example, the receivers relating to each record may be transformed from the time-receiver domain to the tau-p domain. The process may then continue by working within a common p section. In another embodiment, the output data may be derived in a model domain. For this approach, an additional model reverse transform R may be included in the inversion, as illustrated in equation (9):

$$k = CRo_m. \quad (9)$$

In this case, the output $o_m$ is derived in a model domain, and a reverse model transform R is included as part of the inversion. The model domain may be the tau-p domain, and the reverse model transform R may be the reverse tau-p transform, which is related to a reverse slant stack operation. The use of a reverse model transform may impose constraints on the output data, e.g., a dip limit. In addition, the use of model domain sparseness weights, M, may be used to further constrain the output, and to go to higher frequencies, e.g., $$k = CRM\hat{o}_m. \quad (10)$$

Model domain sparseness weights may help the solution to go beyond spatial aliasing.

In the case that aliasing is present in the sub-datasets $DS_i$, in step 702, the interpolation step 704 may be modified to be performed to a finer spatial sampling than the input data so that the interpolated data is calculated not only to the original record positions, but also to new positions located between the original record positions. For example, the input seismic data may be acquired with a 25 m shotpoint distance, but the output of the interpolation in step 704 may be at a shotpoint interval of 12.5 m or 6.25 m. In this case, the output of this approach may be considered to jointly interpolate and deblend the input data. In this case, the interpolated data could be processed either on its own, or in combination with the original traces to produce an image of the subsurface in step 708. Alternatively, the interpolated data may be dropped after deblending, and not used for further processing.

As an alternative, the approach may be used to deblend only the low frequencies, and the result of the deblended low frequencies may be used to help deblend the high frequencies. For example, the deblended low frequencies may be used to characterize the dip of the events in a localized spatial window. Then, the dip of the events may be used to extract the signal relating to a given source array from the blended or interpolated data.

In another embodiment, the methods described so far may be used for source-side and receiver-side deghosting. Apparition-style source-side deghosting has been discussed in a Geophysics paper by Robertsoon et al. (2017). This paper shows that it is not necessary to have N sources firing simultaneously as in blended acquisition, but instead the source array may be fired at alternating depths (e.g., flip/flop sources). The second source array then become virtual sources (i.e., the source ghost) which are located at mirror locations from the sea surface. Under this approach, the modulation codes (e.g., matrix A in equation (3) and/or matrix C in equation (9)) become time-shifting redatuming operators. By source-receiver reciprocity, the ghost can be modelled on the receiver side by considering the same formulation and acquisition geometry but now the wavefields are recorded at receivers with different depths whilst the source depth is kept constant. Common acquisition strategies such as over/under streamers and variable-depth streamers are ways to obtain recordings at different receiver depths. As an example, for receiver-deghosting, a common-offset gather, sub-surface offset gather, angle gather, dip-angle gather, or migrated offset volumes, from split-spread marine acquisition where the positive offsets and negative offsets have different depths could be used as gather to perform patterend-based deghosting. The approach may work in spatial windows, where the ghost delay may be assumed to be constant. The ghost delay may be calculated using the source or receiver depth and a velocity model, for example using ray-tracing, or through analysis of the data itself, for example using correlation picking to find the ghost delay. The amplitude of the ghost (or residual ghost, if partial deghosting has been applied earlier in the processing sequence) may also be derived from the data.

Furthermore, equations (6), (7), (8) and (9) may be extended to account for the situation where sources are in a 3D geometry and not in a 2D geometry as demonstrated by FIG. 9. For a 3D data geometry, the data may be interpolated as required in 2D and/or 3D.

Figure 10:
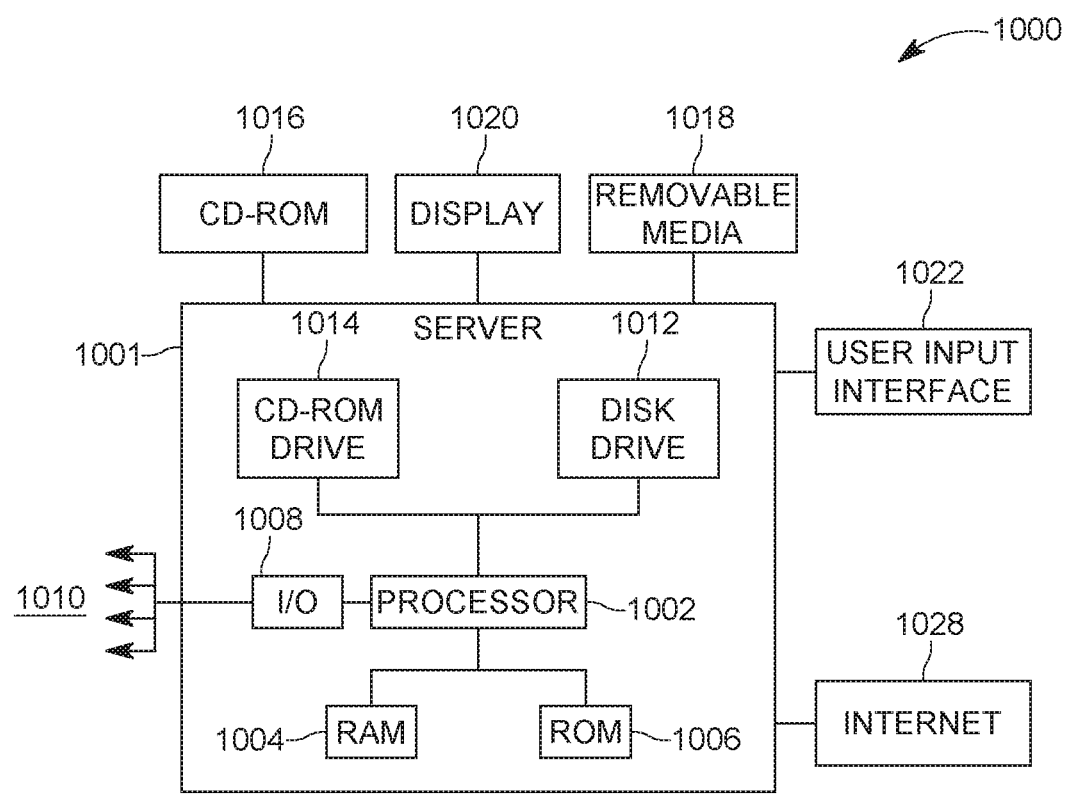
FIG. 10 is a schematic diagram of a computing device configured to perform one or more of the above-discussed methods.

The above method and others may be implemented in a computing system specifically configured to calculate the subsurface image. An example of a representative computing system capable of carrying out operations in accordance with the exemplary embodiments is illustrated in FIG. 10. Hardware, firmware, software or a combination thereof may be used to perform the various steps and operations described herein.

The exemplary computing system 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. ROM 1006 may also be other types of storage media to store programs, such as programmable ROM (PROM), erasable PROM (EPROM), etc. Processor 1002 may communicate with other internal and external components through input/output (I/O) circuitry 1008 and bussing 1010, to provide control signals and the like. Processor 1002 carries out a variety of functions as are known in the art, as dictated by software and/or firmware instructions.

The server 1001 may also include one or more data storage devices, including a disk drive 1012, CD-ROM drives 1014, and other hardware capable of reading and/or storing information such as DVD, etc. In one embodiment, software for carrying out the above-discussed steps may be stored and distributed on a CD- or DVD-ROM 1016, removable memory device 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD, LED displays, plasma displays, cathode ray tubes (CRT), etc. A user input interface 1022 is provided, including one or more user interface mechanisms such as a mouse, keyboard, microphone, touchpad, touch screen, voice-recognition system, etc.

The server 1001 may be coupled to other computing devices, such as landline and/or wireless terminals, via a network. The server may be part of a larger network configuration as in a global area network (GAN) such as the Internet 1028, which allows ultimate connection to various landline and/or mobile client devices. The computing device may be implemented on a vehicle that performs a land seismic survey.

The disclosed exemplary embodiments provide a system and a method for de-blending recorded seismic data, where the seismic data has been recorded with a given pattern. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for de-blending seismic data associated with an interface located in a subsurface of the earth, the method comprising:
   receiving blended seismic data E generated by firing N source arrays according to a pre-determined sequence Seq;
   selecting N sub-datasets SDn from the blended seismic data E;
   interpolating each selected sub-dataset SDn to reference positions ref, where the blended seismic data E is expected to be recorded, to generate interpolated data k;
   de-blending, in a processor, the interpolated data k to generate de-blended data o; and
   generating an image of the interface of the subsurface based on the de-blended data o.

2. The method of claim 1, wherein the pre-determined sequence Seq is repeated throughout at least one part of a seismic survey and the sequence Seq has N terms.

3. The method of claim 2, wherein each term of the sequence Seq modifies a firing parameter of a single source array of the N source arrays, at a corresponding reference ref.

4. The method of claim 3, wherein the firing parameter is a time delay, an amplitude or a phase.

5. The method of claim 4 where the firing parameter is constant with temporal frequency or where the firing parameter varies with temporal frequency.

6. The method of claim 3, wherein a modification of the firing parameter is constant throughout a sail-line of a seismic survey.

7. The method of claim 1, wherein the N sub-datasets SDn are selected so that an intersection of any two sub-datasets SDn and SDm is zero and a reunion of all the selected sub-datasets SDn is the blended seismic data E.

8. The method of claim 1, wherein the interpolated data k includes, for each reference ref, a recorded value from one sub-dataset SDn and N−1 interpolated values from all other sub-datasets.

9. The method of claim 8, wherein the step of de-blending minimizes a problem that is defined by the interpolated data k, the deblended data o, and a set of operators C.

10. The method of claim 9, wherein the set of operators C includes first terms p, which are periodic in the sequence Seq.

11. The method of claim 10, wherein the first terms p refer to a time delay, or an amplitude change of a source signal or a phase change of the source signal.

12. The method of claim 10, wherein the set of operators C includes second terms c, which are constant and fixed for a given source array for all sequences.

13. The method of claim 1, wherein the deblending is firstly performed at low temporal frequencies, and the resulting deblended data is subsequently used to deblend higher temporal frequencies.

14. The method of claim 1, wherein the interpolated data has a finer sampling than the blended seismic data E.

15. A method for de-blending seismic data associated with an interface located in a subsurface of the earth, the method comprising:
   receiving blended seismic data E generated by plural simultaneous firings of N source arrays, wherein the blended seismic data is encoded using N predefined source array emission modifications;
   selecting N sub-datasets SDn from the blended seismic data E such that each sub-dataset SDn is associated with a predefined and specific source emission modification;
   interpolating each selected sub-dataset SDn to reference positions ref, where the blended seismic data E is expected to be recorded, to generate interpolated data k;
   de-blending, in a processor, the interpolated data k to generate de-blended data o; and
   generating an image of the interface of the subsurface based on the de-blended data o,
   wherein the N predefined source array emission modifications are related to one of a phase rotation or amplitude scaling.

16. The method of claim 15, wherein the phase rotation or amplitude scaling may vary with a temporal frequency.

17. A computing system for de-blending seismic data associated with an interface located in a subsurface of the earth, the computing device comprising:
   an interface for receiving blended seismic data E generated by firing N source arrays according to a pre-determined sequence Seq; and
   a processor connected to the interface and configured to:
   select N sub-datasets SDn from the blended seismic data E;
   interpolate each selected sub-dataset SDn to reference positions ref, where the blended seismic data E is expected to be recorded, to generate interpolated data k;
   de-blend, in a processor, the interpolated data k to generate de-blended data o; and
   generate an image of the interface of the subsurface based on the de-blended data o.

18. The system of claim 17, wherein the pre-determined sequence Seq is repeated throughout the seismic survey and the sequence Seq has N terms.

19. The system of claim 18, wherein each term of the sequence Seq modifies a firing parameter of a single source array of the N source arrays, at a corresponding reference ref.

20. The system of claim 19, wherein the firing parameter is a time delay, an amplitude or a phase.

\* \* \* \* \*